(12) United States Patent
Muramatsu et al.

(10) Patent No.: US 11,459,012 B2
(45) Date of Patent: Oct. 4, 2022

(54) STEERING WHEEL CORE METAL (71) Applicant: NIHON PLAST CO., LTD., Fujinomiya (JP)

(72) Inventors: Katsuya Muramatsu, Shizuoka (JP); Akito Urushibata, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 0 days.

(21) Appl. No.: 17/327,822

(22) Filed: May 24, 2021

(65) Prior Publication Data

US 2021/0371002 A1 Dec. 2, 2021

(30) Foreign Application Priority Data

May 29, 2020 (JP) .............................. JP2020-093892

(51) Int. Cl.
*B62D 1/04* (2006.01)
*B62D 1/08* (2006.01)
*B62D 1/10* (2006.01)

(52) U.S. Cl.
CPC ................. *B62D 1/08* (2013.01); *B62D 1/04* (2013.01); *B62D 1/10* (2013.01)

(58) Field of Classification Search
CPC ... G05G 1/04; G05G 1/08; G05G 1/10; B62D 1/04; B62D 1/08; B62D 1/10
See application file for complete search history.

(56) References Cited

U.S. PATENT DOCUMENTS

| 5,244,230 | A | * | 9/1993 | Komiya | ................... | B62D 1/11 280/750 |
| 5,544,545 | A | * | 8/1996 | Sanders | ................... | B62D 1/04 29/894.1 |
| 6,073,514 | A | * | 6/2000 | Isomura | ................... | B62D 1/11 280/777 |
| 6,453,769 | B2 | * | 9/2002 | Sakurai | ............... | B60R 21/2037 74/552 |
| 7,012,202 | B2 | * | 3/2006 | Mizukoshi | ........... | B60Q 1/0082 200/61.54 |
| 10,357,820 | B2 | * | 7/2019 | Kitajo | ........................ | B22C 9/06 |
| 2001/0025546 | A1 | * | 10/2001 | Sugiyama | ................ | B62D 1/11 74/552 |

(Continued)

FOREIGN PATENT DOCUMENTS

JP 2001-213329 8/2001

*Primary Examiner* — Adam D Rogers
(74) *Attorney, Agent, or Firm* — Amin, Turocy & Watson, LLP (57) ABSTRACT

There is provided a core of a steering wheel to which a module can be stably fixed while manufacturing cost is suppressed. Core (28) includes boss core portion (36) at which a gate of a mold is set and which is connected to a steering shaft. Core (28) includes a rim core portion that is positioned around boss core portion (36). Core (28) includes a plurality of spoke core portions (37) that connect boss core portion (36) to the rim core portion. Core (28) includes connecting portion (66) that includes fixing portion (66*e*) to which a module is fixed and connects spoke core portions (37) positioned on upper and lower sides in a neutral state of the steering wheel. Core (28) includes expansion portion (71) of which a width gradually increases downward toward upper end portion (66*a*) of connecting portion (66) in the neutral state of the steering wheel.

3 Claims, 5 Drawing Sheets

(56) References Cited

U.S. PATENT DOCUMENTS

| | | | |
|---|---|---|---|
| 2002/0100342 A1* | 8/2002 | Drefahl | B62D 1/04 74/552 |
| 2013/0112035 A1* | 5/2013 | Nagata | G05G 1/10 74/552 |

* cited by examiner

STEERING WHEEL CORE METAL

CROSS REFERENCE TO RELATED APPLICATIONS

This application is entitled to and claims the benefit of Japanese Patent Application No. 2020-093892 filed on May 29, 2020, the disclosure of which including the specification, drawings and abstract is incorporated herein by reference in its entirety.

TECHNICAL FIELD

The present invention relates to a core of a steering wheel that is cast using a mold.

BACKGROUND ART

In the related art, a steering wheel is used in a vehicle, such as an automobile. The steering wheel includes a rim portion that has an annular shape and is gripped and operated by an occupant, a boss portion that is positioned on the inside of the rim portion and is connected to a steering shaft, and a plurality of spoke portions that connect the rim portion to the boss portion. The steering wheel includes a core made of metal or a core metal. A rim core portion, a boss core portion, and a plurality of spoke core portions corresponding to the rim portion, the boss portion, and the respective spoke portions are set at the core.

For example, a core, which includes spoke core portions at upper and lower portions thereof and in which the upper and lower spoke core portions are connected to each other by connecting portions and an air bag module is fixed to fixing portions formed in the connecting portions, is known (for example, see PTL 1).

In this case is cast, it is difficult to stably form the junctions (welds) of the molten metal of the material of the core, that is, molten metal, which flows into the connecting portions from the upper and lower portions of the spoke core portions, at constant positions. Generally, the junctions of molten metal are relatively weak portions. For this reason, when a load is applied to the lower portion of the rim portion of the steering wheel from an occupant side, which is a front side, in a case where the junctions are formed near the fixing portions formed in the connecting portions, the lower portion of the rim portion is bent toward a side opposite an occupant, which is a back side, together with the connecting portions from the junctions of the molten metal as base points. That is, it is conceivable that the mounting state of the air bag module is affected since the connecting portions are deformed from the immediate vicinity of the fixing portions in this case.

Accordingly, in a case where the strength of the core including the fixing portions for the air bag module is improved or a structure not easily affected by deformation is employed, manufacturing cost will be increased.

CITATION LIST

Patent Literature

PTL 1
Japanese Patent Application Laid-Open No. 2001-213329 (pages 4 to 7, FIG. 1)

SUMMARY OF INVENTION

Technical Problem

As described above, a core to which a module can be stably fixed while manufacturing cost is suppressed is desired.

The present invention has been made in consideration of this point, and an object of the present invention is to provide a core of a steering wheel to which a module can be stably fixed while manufacturing cost is suppressed.

Solution to Problem

A core of a steering wheel according to a first aspect of the present invention is cast using a mold. The core includes a boss core portion at which a gate of the mold is set and which is connected to a shaft for steering, a rim core portion that is positioned around the boss core portion, a plurality of spoke core portions that connect the boss core portion to the rim core portion, a connecting portion that includes a fixing portion to which a module is fixed and connects the spoke core portions positioned on upper and lower sides in a neutral state of the steering wheel, and an expansion portion of which a width gradually increases downward toward an upper end portion of the connecting portion in the neutral state of the steering wheel.

According to a second aspect of the present invention, in the core of a steering wheel according to the first aspect of the present invention, the expansion portion is wider than the spoke core portion present at a position connected to a side of the connecting portion opposite to the expansion portion.

According to a third aspect of the present invention, in the core of a steering wheel according to the first or second aspect of the present invention, the connecting portion includes a constricted portion at a lower end portion thereof in the neutral state of the steering wheel.

Advantageous Effects of Invention

According to the core of a steering wheel of the first aspect of the present invention, molten metal is made to positively flow to the upper end portion of the connecting portion through the expansion portion so as to facilitate a casting flow and the junction of molten metal is set near the lower end portion of the connecting portion, so that a relatively weak portion can be stably formed near the lower end portion of the connecting portion. For this reason, since only the lower end portion of the connecting portion is deformed or fractured against excessive stress, a state where the fixing portion formed at the connecting portion is connected to the side spoke core portion can be kept. Further, it is not necessary to improve the strength of the core including the fixing portion for the module or to employ a structure that is difficult to be affected by deformation. Accordingly, while manufacturing cost is suppressed, the module can be stably fixed.

According to the core of a steering wheel of the second aspect of the present invention, in addition to the effects of the core of a steering wheel according to the first aspect of the present invention, a casting flow to the connecting portion can be further facilitated since the mold acts as a flow branch wall for branching the molten metal to the upper end portion of the connecting portion at a position on a side of the connecting portion opposite to the expansion portion.

According to the core of a steering wheel of the third aspect of the present invention, in addition to the effects of the core of a steering wheel according to the first or second aspect of the present invention, the flow of the molten metal is constricted at the position of the constricted portion, the lower end portion of the connecting portion serves as the junction of the molten metal for cast, and a relatively weak portion can be more stably formed near the lower end portion of the connecting portion.

BRIEF DESCRIPTION OF DRAWINGS

FIGS. 3A and 3B are rear views showing a part of a module to be mounted on the core, FIG. 3A shows an example thereof, and FIG. 3B shows another example thereof;

DESCRIPTION OF EMBODIMENTS

An embodiment of the present invention will be described below with reference to the drawings.

Figure 6:
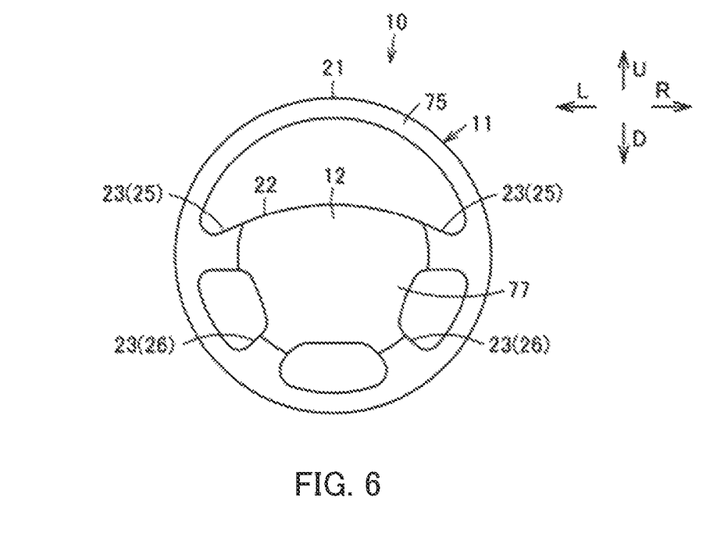
FIG. 6 is a front view showing a steering wheel includes the core.

In FIG. 6, 10 denotes a steering wheel as an automotive component. Steering wheel 10 is disposed in front of an occupant seated in the driver's seat of an automobile, and includes steering wheel body 11, module 12 that is an installation body to be mounted on the occupant side of steering wheel body 11, a back cover that is a cover body as a cover member (not shown) to be mounted on the side of steering wheel body 11 opposite the occupant, that is, the side of steering wheel body 11 opposite to module 12, and the like. Further, a finisher (garnish) as a decorative member (not shown) and the like are mounted on the occupant side of steering wheel body 11 of steering wheel 10 as necessary.

Steering wheel 10 is mounted on a steering shaft that is a shaft for steering as a control apparatus (not shown) usually provided to be inclined with respect to a horizontal direction (vertical direction). Hereinafter, a side corresponding to module 12 will be referred to as an occupant side; a front side or a rear side and a steering shaft side will be referred to as a vehicle body side and a back side or a front side; a front-rear direction along the steering shaft will be referred to as an axial direction; and directions, such as a left-right direction (directions of arrows L and R) and an up-down direction (directions of arrows U and D), will be described on the basis of the straight direction of a vehicle body in which steering wheel 10 is provided. Further, steering wheel 10 will be described in a steering reference state, that is, a neutral state, unless otherwise specified.

Furthermore, steering wheel body 11 includes rim portion (ring portion) 21, boss portion (mount portion) 22 that is a hub portion as a central portion positioned inside rim portion 21, and a plurality of, for example, three or more spoke portions 23 that connects rim portion 21 to boss portion 22.

Rim portion 21 is positioned around boss portion 22. Rim portion 21 is formed in an arc shape. In this embodiment, rim portion 21 is formed in an annular shape and is positioned so as to surround the outside of boss portion 22.

Boss portion 22 is mainly formed of module 12.

Three or more spoke portions 23 are set. In this embodiment, spoke portions 23 make pairs in the up-down direction and are set on both left and right. That is, spoke portions 23 are formed of side spoke portions 25 that are first spoke portions positioned on the upper side and lower spoke portions 26 that are second spoke portions positioned on the lower side, and side spoke portion 25 and lower spoke portion 26 make a pair and are set on each of the left and right. That is, four spoke portions 23 of this embodiment are set.

One side spoke portion 25 extends in the left-right direction so as to connect the left portion of boss portion 22 to a position of rim portion 21 corresponding to 9 o'clock of an analog watch, and the other side spoke portion 25 extends in the left-right direction so as to connect the right portion of boss portion 22 to a position of rim portion 21 corresponding to 3 o'clock of an analog watch.

One lower spoke portion 26 extends in the up-down direction so as to connect the lower portion of boss portion 22 to a position of rim portion 21 corresponding to 7 or 8 o'clock of an analog watch, and the other lower spoke portion 26 extends in the up-down direction so as to connect the lower portion of boss portion 22 to a position of rim portion 21 corresponding to 5 or 4 o'clock of an analog watch.

Side spoke portions 25 and lower spoke portions 26 are disposed away from each other in the up-down direction.

Spoke portions 23 are disposed symmetrically or substantially symmetrically in the left-right direction with respect to the center of steering wheel body 11.

Figure 2:
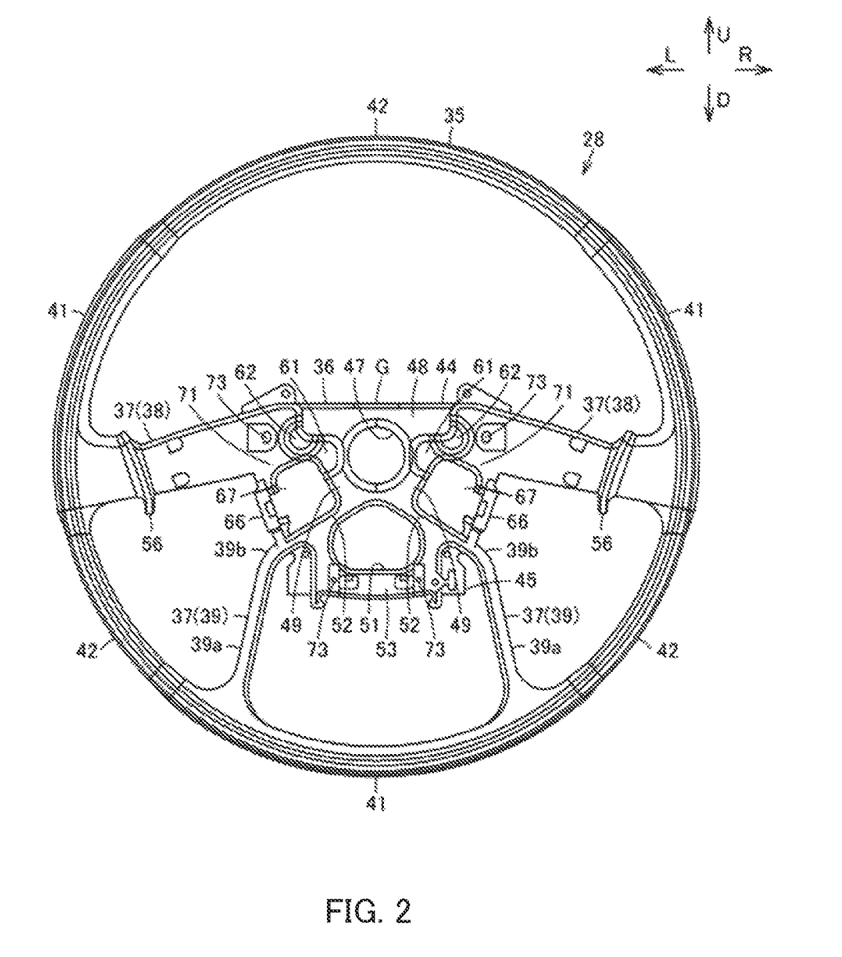
FIG. 2 is a front view of the core.

Further, steering wheel body 11 includes core 28 shown in FIG. 2. Core 28 is a metal core that is integrally molded with metal, such as aluminum or iron. Core 28 is cast using a mold (not shown). Core 28 corresponds to rim portion 21, boss portion 22, and the plurality of spoke portions 23 (FIG. 6), and includes arc-shaped rim core portion 35, boss core portion 36, and a plurality of, for example, three or more spoke core portions 37. Accordingly, in this embodiment, spoke core portions 37 make pairs in the up-down direction and are set on both left and right. That is, spoke core portions 37 are formed of side spoke core portions 38 that are first spoke core portions corresponding to side spoke portions 25 (FIG. 6) positioned on the upper side and lower spoke core portions 39 that are second spoke core portions corresponding to lower spoke portions 26 (FIG. 6) positioned on the lower side, and side spoke core portions 38 and lower spoke core portions 39 make pairs and are set on the left and right. Core 28 is formed substantially symmetrically in the left-right direction.

Rim core portion 35 forms the core of rim portion 21 (FIG. 6). Rim core portion 35 is formed in an arc shape. In this embodiment, rim core portion 35 is formed in an annular shape and surrounds boss core portion 36. Rim core portion 35 includes spoke-connecting portions 41 that are connected to spoke core portions 37. Further, rim core portion 35 includes easily deformable portions 42 that are weak portions (soft portions).

Spoke-connecting portions 41 are set at a plurality of positions on rim core portion 35. In this embodiment, spoke-connecting portions 41 are set at both left and right side portions and a lower portion of rim core portion 35. Spoke-connecting portions 41 and 41 set at both side portions are connected to one side spoke core portion 38 and the other side spoke core portion 38, respectively, and spoke-connecting portion 41 set at the lower portion is connected to one lower spoke core portion 39 and the other lower spoke core portion 39. These spoke-connecting portions 41 are disposed away from each other in a circumferential direction, and are connected to each other by easily deformable portions 42. That is, easily deformable portion 42 is disposed between spoke-connecting portions 41.

Easily deformable portions 42 are portions that cause rim core portion 35 (rim portion 21 (FIG. 6)) to be deformed to be bent forward by the contact between an occupant and rim portion 21 (FIG. 6) to suppress a reaction force to be applied to an occupant from steering wheel 10 (FIG. 6). That is, easily deformable portions 42 cause rim core portion 35 (rim portion 21 (FIG. 6)) to be deformed to release a shock that is caused by the occupant's contact. Easily deformable portion 42 is formed to be thinner than spoke-connecting portion 41. That is, the cross-sectional area of easily deformable portion 42 is set to be smaller than that of spoke-connecting portion 41.

Boss core portion 36 is a portion that forms the core of boss portion 22 (FIG. 6) and supports module 12 (FIG. 6). Boss core portion 36 is positioned on the back side of module 12 (FIG. 6), and is disposed between module 12 (FIG. 6) and the back cover. Boss core portion 36 includes boss core body portion 44 and extending portion 45 that are integrated with each other. Boss core body portion 44 is connected to side spoke core portions 38 of spoke core portions 37, and extending portion 45 is connected to lower spoke core portions 39 of spoke core portions 37.

End portions of one side spoke core portion 38 and the other side spoke core portion 38 are connected to both left and right sides of boss core body portion 44. Both the left and right sides of boss core body portion 44 are formed to be inclined so that the width of boss core body portion 44 is gradually reduced toward the lower side which is a side corresponding to extending portion 45.

Extending portion 45 extends downward from boss core body portion 44. End portions of one lower spoke core portion 39 and the other lower spoke core portion 39 are connected to both left and right sides of extending portion 45.

Further, boss core portion 36 is a portion to be connected to the steering shaft. Circular boss opening 47 is formed in boss core portion 36. Boss opening 47 is spline-coupled to the steering shaft and serves as the center of rotation of steering wheel 10 (FIG. 6). Boss opening 47 is disposed at the middle portion of boss core body portion 44. For this reason, first body portion 48 extending in the left-right direction is formed at boss core body portion 44 above boss opening 47, and narrow second body portions 49 and 49 extending in the up-down direction are formed at boss core body portion 44 on both sides of boss opening 47. One side spoke core portion 38 and the other side spoke core portion 38 are connected to both left and right sides of first body portion 48, second body portions 49 and 49 are connected to the lower left and right portions of first body portion 48, and extending portion 45 is connected to lower end portions of second body portions 49 and 49. Second body portions 49 and 49 are inclined so as to approach each other in the left-right direction toward extending portion 45.

In addition, opening 51 is formed in boss core portion 36. Opening 51 is formed so as to penetrate extending portion 45. Opening 51 is positioned below boss opening 47. Narrow third body portions 52 and 52 are formed at extending portion 45 on both left and right sides of an upper portion of opening 51, and connecting-reinforcing portion 53 is formed over the lower portion from both left and right sides of opening 51. Upper end portions of third body portions 52 and 52 are formed so as to be connected to the lower end portions of second body portions 49 and 49. Third body portions 52 and 52 are inclined so as to be opened in the left-right direction toward the lower side from the upper side. That is, third body portions 52 and 52 are inclined in directions crossing second body portions 49 and 49. Lower spoke core portions 39 and 39 are connected to lower end portions of third body portions 52 and 52. Further, connecting-reinforcing portion 53 is formed in the shape of a loop that connects third body portions 52 and 52 in the left-right direction.

Further, in this embodiment, boss core portion 36 is a portion where a gate through which molten metal is injected to a space portion (cavity portion) formed in a mold for molding core 28 is set. In an example shown in the drawings, the gate of the mold is disposed at position G that corresponds to the middle portion of boss core portion 36 in the left-right direction and the upper end portion thereof. That is, position G is positioned above boss opening 47 at boss core body portion 44. Furthermore, position G is positioned at the middle portion of first body portion 48 in the left-right direction. That is, position G is positioned between left and right side spoke core portions 38.

Spoke core portions 37, which connect boss core portion 36 to rim core portion 35, form the cores of spoke portions 23 (FIG. 6). Spoke core portions 37 are inclined toward the side opposite an occupant from the occupant side toward boss core portion 36 from rim core portion 35.

In spoke core portions 37, each side spoke core portion 38 extends substantially in the left-right direction and is gradually inclined upward toward boss core portion 36 from rim core portion 35. Further, embedded portion 56 is formed at each side spoke core portion 38 near one end portion of each side spoke core portion 38 that is connected to rim core portion 35 (spoke-connecting portions 41).

Furthermore, in this embodiment, the other end portion of each side spoke core portion 38 is formed as protruding portion 61 that protrudes toward the occupant side, that is, the front side with respect to boss core portion 36. Protruding portion 61 is formed over second body portion 49 and boss core body portion 44 of boss core portion 36. Further, recessed portion 62 is formed in protruding portion 61. Recessed portions 62 are to position module 12 (FIG. 6) with respect to core 28. Recessed portion 62 is formed in a circular shape as viewed from the front.

Furthermore, in spoke core portions 37, each lower spoke core portion 39 extends substantially in the up-down direction. Each lower spoke core portion 39 is formed in an elongated linear shape narrower than each side spoke core portion 38. In this embodiment, each lower spoke core portion 39 includes rim-side connecting portion 39a and boss-side connecting portion 39b that are integrated with each other. Rim-side connecting portion 39a is a second spoke core portion-body portion that is connected to rim core portion 35 and extends in the up-down direction, and boss-side connecting portion 39b is connected to boss core portion 36. Rim-side connecting portion 39a is formed to be longer than boss-side connecting portion 39b. Boss-side connecting portion 39b is formed so as to be inclined toward the center of rotation of steering wheel 10 (FIG. 6) with respect to rim-side connecting portion 39a. Accordingly, each lower spoke core portion 39 is bent at a position where rim-side connecting portion 39a and boss-side connecting portion 39b are connected to each other. Boss-side connecting portions 39b are connected to third body portions 52, respectively. Boss-side connecting portion 39b is positioned on the extension of third body portion 52, and extends in a direction crossing second body portion 49.

In addition, spoke core portions 37 making pairs, that is, each side spoke core portion 38 and each lower spoke core portion 39 are connected to each other by connecting portion 66. Each connecting portion 66 extends in the up-down direction that is a direction crossing side spoke core portion 38 and lower spoke core portion 39, the upper end portion of connecting portion 66 is connected to side spoke core portion 38, and the lower end portion of connecting portion 66 is connected to lower spoke core portion 39. In this embodiment, each connecting portion 66 is inclined in a direction where connecting portion 66 is gradually away from boss core portion 36 toward the upper side from the lower side. In the example shown in the drawings, each connecting portion 66 is positioned in parallel to or substantially in parallel to second body portion 49 of boss core portion 36. Opening space portion 67 is surrounded by connecting portion 66, boss core portion 36 (second body portion 49), side spoke core portion 38, and lower spoke core portion 39.

Figure 1:
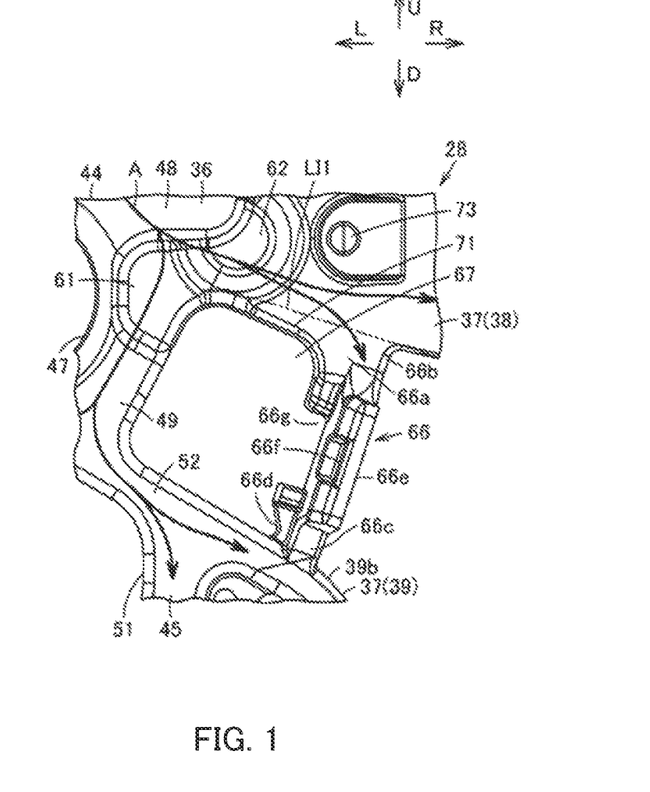
FIG. 1 is an enlarged front view showing a part of a core of a steering wheel according to an embodiment of the present invention.

As shown in FIG. 1, upper end portion 66a of each connecting portion 66, which is an end portion (first end portion) connected to side spoke core portion 38, is an enlarged end portion that is formed so as to have the largest cross-sectional area. In this embodiment, upper end portion 66a of connecting portion 66 is formed so as to be the widest in connecting portion 66. Upper end portion 66a of connecting portion 66 is a gate-near-side end portion of connecting portion 66 that is present at a position closest to position G (FIG. 2) of the gate of the mold used to cast core 28, and is connected to boss core portion 36. For this reason, upper end portion 66a of connecting portion 66 is an inflow-side end portion in which molten metal supplied from the gate flows. Expansion portion 71 is formed so as to be connected to upper end portion 66a of connecting portion 66. Expansion portion 71 is formed so that the width of expansion portion 71 gradually increases downward as expansion portion 71 is away from the gate toward upper end portion 66a of connecting portion 66. Expansion portion 71 is formed at a position where boss core portion 36 and each side spoke core portion 38 are connected to each other. In this embodiment, expansion portion 71 is present at the position of the other end portion of each side spoke core portion 38 or protruding portion 61. Further, expansion portion 71 is wider than spoke core portion 37 (side spoke core portion 38) present at a position connected to a side of connecting portion 66 opposite to expansion portion 71. That is, the width of expansion portion 71 increases downward from imaginary line LI1 that extends from the width of side spoke core portions 38 present at a position on a side of connecting portion 66 opposite to expansion portion 71, and the width of expansion portion 71 increases as expansion portion 71 approaches upper end portion 66a of connecting portion 66. Expansion portion 71 and upper end portion 66a of connecting portion 66 are smoothly connected to each other so as to be gradually curved toward a side edge portion of upper end portion 66a of connecting portion 66 from expansion portion 71. In addition, a side of upper end portion 66a of connecting portion 66 opposite to the side edge portion connected to expansion portion 71, that is, a side edge portion of upper end portion 66a of connecting portion 66 connected to side spoke core portions 38 is extension portion 66b that lineally extends in the longitudinal direction of connecting portion 66. Extension portion 66b is bent more sharply than the side edge portion of upper end portion 66a of connecting portion 66 connected to expansion portion 71, and is connected to side spoke core portions 38.

On the other hand, lower end portion 66c of connecting portion 66, which is an end portion (second end portion) connected to lower spoke core portion 39, is a gate-far-side end portion that is present at a position farthest from position G (FIG. 2) of the gate of the mold used to cast core 28. For this reason, lower end portion 66c of connecting portion 66 is an outflow-side end portion from which molten metal supplied from the gate flows to spoke core portion 37 (lower spoke core portion 39). Lower end portion 66c of connecting portion 66 is a weak-shaped portion that is formed in a shape having a strength lower than upper end portion 66a. In this embodiment, lower end portion 66c of connecting portion 66 is a weak portion that is formed to be thinner than upper end portion 66a in the front-rear direction. Further, constricted portion 66d of which the cross-sectional area is smaller than that of upper end portion 66a is formed at lower end portion 66c of connecting portion 66. Constricted portion 66d is disposed at the side edge portion of connecting portion 66 where lower end portion 66c of connecting portion 66 and lower spoke core portion 39 are connected to each other. Constricted portion 66d is formed to be constricted so that the width of constricted portion 66d is gradually reduced toward lower spoke core portion 39. In this embodiment, constricted portion 66d is formed so as to be constricted toward lower end portion 66c of connecting portion 66. In the example shown in the drawings, constricted portion 66d is formed at an acute angle with respect to the flow direction of molten metal forming connecting portion 66, that is, the longitudinal direction of connecting portion 66.

In addition, fixing portion 66e used to fix module 12 (FIG. 6) by fixing member (fastening member) 72, such as a bolt, (FIG. 4) is formed at each connecting portion 66. Upper end portion 66a and lower end portion 66c of connecting portion 66 are connected to each other to form fixing portion 66e. That is, fixing portion 66e is positioned between upper end portion 66a and lower end portion 66c of connecting portion 66. Fixing portion 66e is formed in the shape of a plate that rises to the front side from connecting portion 66. Fastening hole portion 66f, which is a fixing hole into which fixing member 72 (FIG. 4) is to be inserted, is formed in fixing portion 66e. Fastening hole portion 66f is formed so as to penetrate fixing portion 66e.

Further, in this embodiment, cut-out portion 66g is formed at a position between upper end portion 66a and lower end portion 66c of connecting portion 66. Cut-out portion 66g is positioned on the inside of fixing portion 66e, that is, the side of fixing portion 66e facing opening space portion 67, and communicates with opening space portion 67.

In addition, fixed contacts 73 used to operate a horn apparatus, which blows a horn by an occupant's operation for pushing module 12 (FIG. 6), are set at core 28. Fixed contacts 73 are preferably disposed on the left and right sides and are more preferably disposed on the upper and lower sides. In this embodiment, fixed contacts 73 are disposed at connecting portions between boss core portion 36 and left and right side spoke core portions 38 and on both left and right sides of connecting-reinforcing portion 53 of boss core portion 36.

Further, a part of core 28 is covered with cover portion 75 shown in FIG. 6. Cover portion 75 forms the design surface of rim portion 21. Cover portion 75 is a portion that is made of a synthetic resin and is molded with a soft synthetic resin (for example, a synthetic resin softer than a connected body), such as polyurethane. A skin material, such as leather or a synthetic resin, can be wound on cover portion 75 as necessary. In the entire rim core portion 35 of core 28 shown in FIG. 2, a portion between the end portion of each side spoke core portion 38 connected to rim core portion 35 and embedded portion 56 and an end portion of each lower spoke core portion 39 connected to rim core portion 35, that is, a lower end portion of each rim-side connecting portion 39a opposite to boss-side connecting portion 39b are embedded in cover portion 75 shown in FIG. 6.

For example, an air bag apparatus, which stores an air bag, or the like is suitably used as module 12. However, for example, other arbitrary bodies, such as a pad body storing a shock absorber and a body in which items are not stored, can also be used instead of the air bag apparatus. In this embodiment, module 12 includes horn plate 76 that is a fixed member shown in FIG. 3A, FIG. 3B, or the like and module body section 77 (FIG. 6) that is supported by horn plate 76, and forms a part of the horn apparatus that blows a horn by an occupant's operation.

A conductive metal plate, a synthetic resin, and the like are integrated by insert molding to form horn plate 76. Horn plate 76 includes metal portions 78 and resin portion 79 that are exposed to the appearance.

Figure 3A:
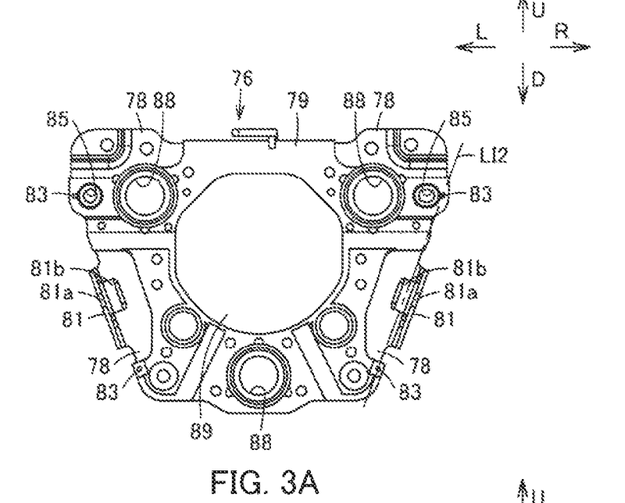
Figure 3B:
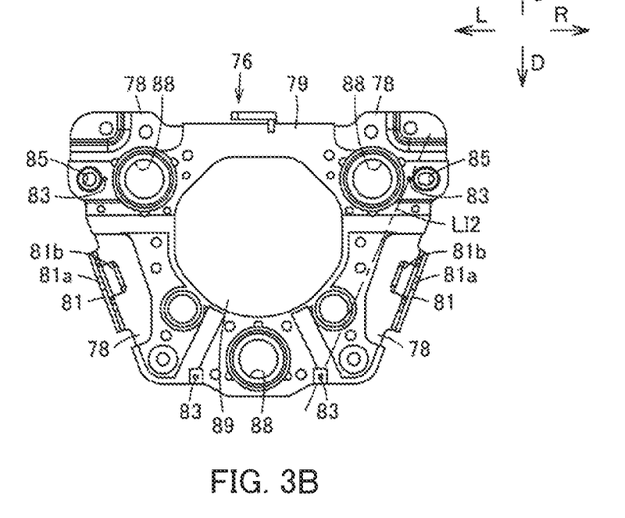
Figure 4:
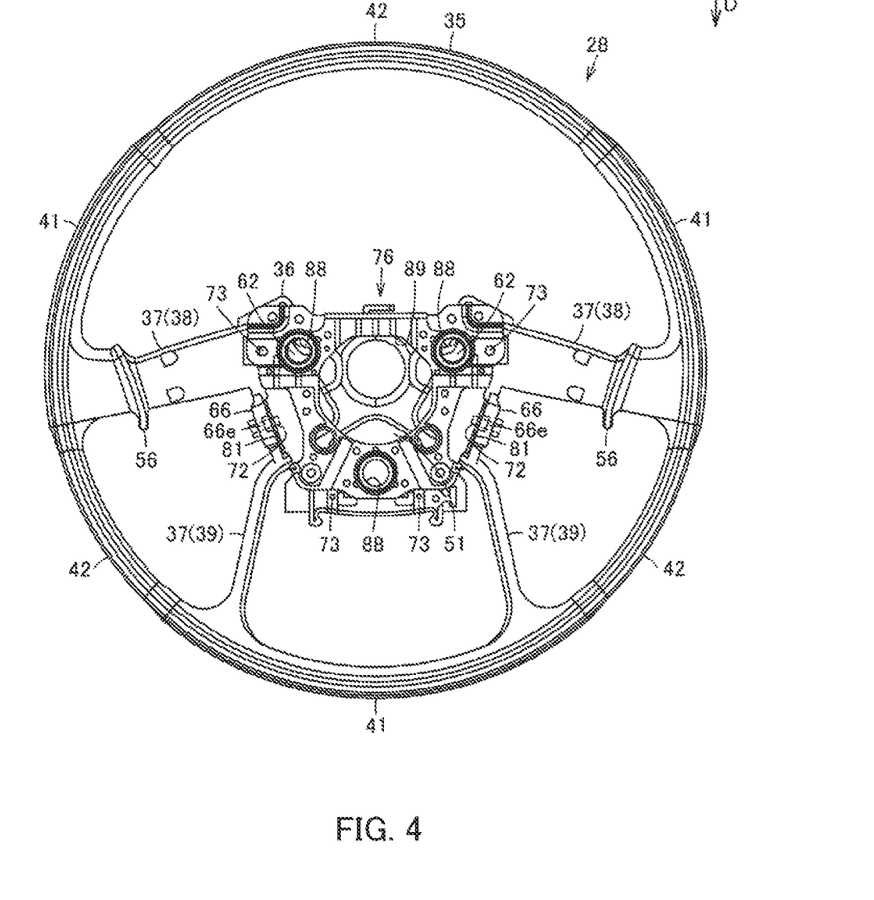
FIG. 4 is a front view showing a state where a part of the module is mounted on the core.

Horn plate 76 is formed substantially in a quadrangular shape. As shown in FIG. 4, horn plate 76 is fixed to boss core portion 36 of core 28. Horn plate 76 includes fixed portions 81 that are fixed to fixing portions 66e of respective connecting portions 66 by fixing members 72. Fixed portions 81 are disposed on both left and right sides of horn plate 76. Fixed portions 81 protrude in the shape of a plate toward the back side from both the left and right sides of horn plate 76. Fixed portions 81 are formed along both the side edges of horn plate 76. Fixed portions 81 overlap with fixing portions 66e of connecting portions 66. In this embodiment, fixed portions 81 overlap with the insides of fixing portions 66e of connecting portions 66. That is, both the left and right sides of horn plate 76 are restricted by fixing portions 66e of left and right connecting portions 66. As shown in FIG. 3A or 3B, fastening hole portion 81a, which is aligned with fastening hole portion 66f (FIG. 1) and into which fixing member 72 (FIG. 4) is to be inserted, is formed at each of fixed portions 81. That is, as shown in FIG. 4, a surface where fixed portion 81 and fixing portion 66e overlap with each other is a fixing surface (fastening surface) that is mated with fixing member 72 (FIG. 4). Accordingly, the fixing surface is set in parallel to or substantially in parallel to connecting portion 66 or fixing portion 66e. Further, as shown in FIG. 3A or 3B, positioning portion 81b is formed at each fixed portion 81 in this embodiment. Positioning portion 81b protrudes from the tip of each fixed portion 81. Positioning portions 81b are inserted into cut-out portions 66g of core 28 shown in FIG. 2 and allow horn plate 76 to be positioned with respect to core 28 in the left-right direction.

Figure 5:
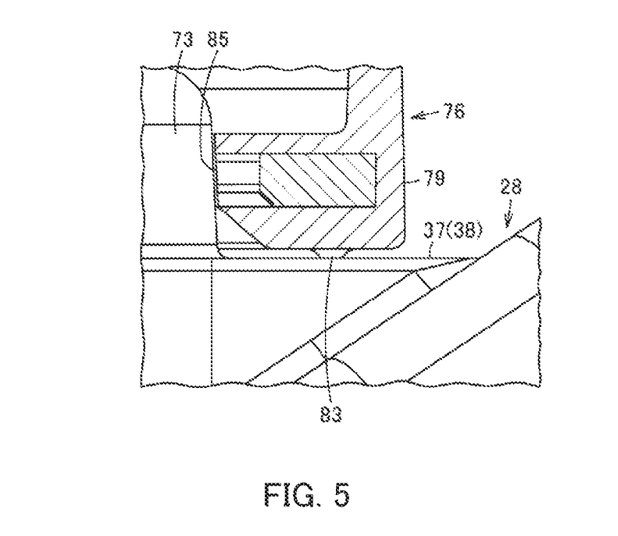
FIG. 5 is a cross-sectional view showing a part of the state where a part of the module is mounted on the core.

Furthermore, in this embodiment, horn plate 76 includes ground portions 83 that are grounded on core 28 as shown in FIG. 5. Ground portions 83 are formed on resin portion 79. Ground portions 83 are point-like protrusion portions that protrude from resin portion 79 to the back side. Ground portions 83 are in point contact with core 28, inhibit horn plate 76 from rattling by strongly interfering with or being crushed against core 28 in a case where horn plate 76 and core 28 are fixed to each other by fixing members 72 (FIG. 4), and obtain good mating with core 28. As in an example shown in FIG. 3A or 3B, ground portions 83 are preferably set at the upper, lower, left, and right portions of horn plate 76, respectively. In this embodiment, ground portions 83 are disposed near four corners of horn plate 76. Ground portions 83 are disposed on the upper and lower sides of fixed portions 81 with reference to fixed portions 81, respectively. In an example shown in FIG. 3A, ground portions 83 positioned on the upper side of fixed portions 81 are positioned on the outer side than insertion hole portions 85 formed in horn plate 76. Further, in another example shown in FIG. 3B, ground portions 83 positioned on the upper side of fixed portions 81 are positioned on the inner side than insertion hole portions 85. Imaginary line L12 connecting ground portion 83, which is positioned on the upper side of fixed portion 81, to ground portion 83, which is positioned on the lower side of fixed portion 81 on the same side as ground portion 83 positioned on the upper side of fixed portion 81 in the left-right direction, is substantially parallel to the fixing surface that is set by fixed portion 81 of horn plate 76 and fixing portion 66e (FIG. 1) of connecting portion 66 of core 28 or a direction that is orthogonal to the axis of the fastening torque of fixing member 72 (FIG. 4).

As shown in FIG. 5, insertion hole portions 85 are portions into which fixed contacts 73 provided at the upper portion of core 28 are to be inserted. Insertion hole portions 85 are formed so as to penetrate metal portions 78 and resin portion 79 of horn plate 76.

Further, as shown in FIG. 3A or 3B, support hole portions 88 used to support module body section 77 are formed in horn plate 76. A plurality of support hole portions 88 are formed. In this embodiment, support hole portions 88 are formed at the left and right portions of an upper portion of horn plate 76 and the central portion of a lower portion thereof in the left-right direction. Both left and right support hole portions 88 positioned at the upper portion are at positions facing recessed portions 62 of core 28 in a state where horn plate 76 is mounted on core 28 as shown in FIG. 5. Furthermore, support hole portion 88 positioned at the lower portion is at a position facing opening 51 of core 28 in a state where horn plate 76 is mounted on core 28.

In addition, plate opening 89 is formed at the middle portion of horn plate 76 as shown in FIG. 3A or 3B. Plate opening 89 is formed in a substantially circular shape. Plate opening 89 is formed so as to penetrate metal portions 78 and resin portion 79. Support hole portions 88 are disposed around plate opening 89.

In addition, module body section 77 shown in FIG. 6 is a horn pad including movable contacts that are brought into contact with and separated from fixed contacts 73 (FIG. 2) by an occupant's operation. Module body section 77 is supported by a supported portion, which is disposed on the back side, so as to be movable relative to horn plate 76 (FIG. 3A or 3B) or core 28 (FIG. 2) in the front-rear direction, and is elastically biased by biasing means (not shown), such as a spring. Module body section 77 may form the air bag apparatus. In this case, a folded bag-shaped air bag is stored in module body section 77, and an inflator that jets gas for expansion and deployment into the air bag is disposed in module body section 77. The inflator is positioned in plate opening 89 of horn plate 76 shown in FIG. 3A or 3B so as not to interfere with horn plate 76.

Further, a mold is used in a case where core 28 shown in FIG. 2 is to be cast. A vertical mold is suitably used as the mold, but a horizontal mold may be used. Then, the mold is closed, and molten metal is injected into the space portion (cavity portion), which is formed in the mold, from the gate. The molten metal injected from the gate is filled in the space portion from boss core portion 36 via spoke core portions 37 so as to mold rim core portion 35. In more detail, as shown by arrows A of FIG. 1, the molten metal injected from the gate is branched to the positions corresponding to side spoke core portions 38 and lower spoke core portions 39 of spoke core portions 37 from the position corresponding to boss core portion 36.

The molten metal branched to the positions corresponding to side spoke core portions 38 flows toward the positions corresponding to upper end portions 66a of connecting portions 66 from the position corresponding to first body portion 48 of boss core portion 36. In this case, since expansion portions 71 of which the widths increase toward the positions corresponding to upper end portions 66a of connecting portions 66 are formed, the walls of the mold provided at the positions corresponding to extension portions 66b of connecting portions 66 act as flow branch walls for branching the flow of the molten metal. Accordingly, while the flow of the molten metal to the positions corresponding to upper end portions 66a of connecting portions 66 is facilitated, the molten metal flows to the positions corresponding to side spoke core portions 38. In particular, in a case where the mold is a vertical mold, expansion portions 71 act as fall portions where the molten metal falls. Accordingly, the flow of the molten metal to the positions corresponding to upper end portions 66a of connecting portions 66 is facilitated.

Further, the molten metal branched to the positions corresponding to lower spoke core portions 39 flows to the positions corresponding to lower spoke core portions 39 from the position corresponding to first body portion 48 via the positions corresponding to second body portions 49 and the positions corresponding to third body portions 52.

Then, the molten metal flowing to the positions corresponding to connecting portions 66 flows to the positions corresponding to lower end portions 66c from the positions corresponding to fixing portions 66e, and joins the molten metal flowing at the positions corresponding to lower spoke core portions 39 while being constricted at positions corresponding to constricted portions 66d. Accordingly, the positions corresponding to constricted portions 66d serve as junctions (welds) for cast at the positions corresponding to lower end portions 66c that are the weak-shaped portions.

Cover portion 75 is molded on core 28, which has been cast and detached from the mold, using, for example, RIM molding or the like, so that steering wheel body 11 is molded. In addition, molded steering wheel body 11 is connected to the steering shaft and is mounted on the vehicle body side.

After that, module 12 is mounted on steering wheel body 11. In a case where module 12 is to be mounted, horn plate 76 is mounted on core 28 first in this embodiment.

While both positioning portions 81b of horn plate 76 are inserted into cut-out portions 66g of both fixing portions 66e of core 28, fixed portions 81 overlap with fixing portions 66e and fixed contacts 73 of core 28 are inserted into insertion hole portions 85. In this state, ground portions 83 are grounded on side spoke core portions 38 of core 28 from the front side. Fixing members 72 (FIG. 4) are inserted into fastening hole portions 66f and 81a and are, for example, tightened in this state, so that fixing portions 66e and fixed portions 81 are integrally fixed to each other in a state where fixing portions 66e and fixed portions 81 overlap with each other. Ground portions 83 of horn plate 76 present in a direction orthogonal to the axial direction of tightening torque for fixing members 72 (FIG. 4) are pressed against core 28 by the tightening torque (FIG. 5), and ground portions 83 strongly interfere with or are crushed against core 28 depending on the magnitude of the tightening torque. For this reason, since it is difficult for horn plate 76 to be twisted by the tightening torque, horn plate 76 is fixed to core 28 in a good mating state without rattling.

Then, module body section 77 is supported on horn plate 76 mounted on core 28 by the supported portion and a finisher or the like is mounted as necessary, so that steering wheel 10 is completed in a state where steering wheel 10 is mounted on the vehicle body.

In a case where an occupant pushes module body section 77 of module 12 of steering wheel 10 against the bias of the biasing means, the movable contacts approach fixed contacts 73. In a case where the movable contacts are in contact with fixed contacts 73, a circuit is closed, so that the horn apparatus blows a horn.

As described above, according to this embodiment, the widths of expansion portions 71 gradually increase downward toward upper end portions 66a of connecting portions 66 including fixing portions 66e to which module 12 is fixed, so that molten metal is made to positively flow to upper end portions 66a of connecting portions 66 through expansion portions 71 so as to facilitate a casting flow. Further, the junctions of molten metal are set near lower end portions 66c of connecting portions 66, so that relatively weak portions can be stably formed near lower end portions 66c of connecting portions 66.

For this reason, even though excessive stress is applied to the lower portion of rim portion 21 of steering wheel 10 from the occupant side, which is the front side, in a case where an occupant is to be protected at the time of, for example, a vehicle collision, only lower end portions 66c of connecting portions 66 are deformed or fractured since the positions of the soft portions of core 28 are stable. Accordingly, a state where fixing portions 66e formed at connecting portions 66 are connected to side spoke core portions 38 through upper end portions 66a of connecting portions 66 can be kept.

Further, in a case where the shape of a detailed portion, such as a reinforcing rib, or the shape of a thin plate is frequently used in core 28, a casting flow is reduced and a bent shape, a change in thickness for ensuring strength, and the frequent use of a reinforcing rib facilitate the burning of the mold. Since a casting flow is facilitated by expansion portions 71 connected to upper end portions 66a of connecting portions 66 in this embodiment, the mold has a shape where the burning of the mold is difficult to occur and the rapid deterioration of the durability or material of core 28 caused by the burning of the mold does not easily occur. Accordingly, it is possible to suppress an increase in the maintenance cost of the mold required to maintain a quality and an increase in price caused by a reduction in the life span of the mold. Furthermore, since an increase in surplus cost, such as a design using analysis for preventing a reduction in the holding performance of core 28 holding module 12, an increase in the number of products to be evaluated, and an increase the frequency of a mass-production routine test, is not necessary, an increase in the product cost can be suppressed. That is, it is not necessary to improve the strength of core 28 of this embodiment including fixing portions 66e for module 12 or to employ a structure that is difficult to be affected by deformation.

As a result, module 12 can be stably fixed to core 28 while manufacturing cost is suppressed. Accordingly, since the air bag can be stably deployed even if core 28 (steering wheel body 11) is deformed in configuration where module 12 is provided with the air bag apparatus, the performance of the air bag can be stabilized.

Since expansion portion 71 is wider than side spoke core portion 38 present at a position connected to a side of connecting portion 66 opposite to expansion portion 71, the mold acts as a flow branch wall for branching the molten metal to upper end portion 66a of connecting portion 66 at the position corresponding to extension portion 66b of connecting portion 66 opposite to expansion portion 71. Accordingly, a casting flow to connecting portion 66 from upper end portion 66a can be further facilitated.

Since constricted portion 66d is formed at lower end portion 66c of connecting portion 66 that is an outflow-side end portion from which molten metal supplied from the gate flows to lower spoke core portion 39, the flow of the molten metal is constricted at the position of constricted portion 66d, lower end portion 66c of connecting portion 66 serves as the junction of the molten metal for cast, and a relatively weak portion can be more stably formed near lower end portion 66c of connecting portion 66.

In particular, since lower end portion 66c of connecting portion 66 serves as a weak-shaped portion, the weak-shaped portion and the junction of the molten metal for cast coincide with each other and a relatively weak portion can be stably formed.

In addition, side spoke core portions 38 are connected to lower spoke core portions 39 by connecting portions 66, so that the periphery of boss core portion 36 can be strengthened as a box-shaped rigid body portion. Accordingly, it is possible to improve resonance performance, to suppress the vibration of an engine transmitted through the steering shaft during driving and vibration caused by a reaction force applied from a road surface, and to reduce a reaction force at rim core portion 35 (rim portion 21) below lower spoke core portions 39 (lower spoke portions 26) in a case where excessive stress is applied from the occupant side. As a result, both resonance and a bending reaction force can be achieved.

Further, ground portions 83 formed on horn plate 76 are in contact with core 28, so that the rattling of module 12 with respect to core 28 can be suppressed. For this reason, it is not necessary to use a non-woven fabric for preventing rattling, to use separate highly-accurate parts for positioning horn plate 76 and core 28, or the like; and an increase in part cost, an increase in the number of processes in assembly, an increase in the number of assembly facilities, and the like, which are caused by an increase in the number of parts, are not needed. As a result, the rattling of module 12 with respect to core 28 can be suppressed at low cost.

In particular, ground portions 83 are disposed in parallel or substantially in parallel at mating positions between fixing portion 66e and fixed portion 81 that serve as the fixing surface for each fixing member 72 used to fix horn plate 76 to core 28. Accordingly, in a case where bolts are used as fixing members 72, ground portions 83 can be pressed against core 28, can strongly interfere with core 28, or can be deformed due to stress caused by the fastening torque of the fixing members. As a result, the mating between core 28 and horn plate 76 (module 12) can be improved, and horn plate 76 is difficult to be twisted even though horn plate 76 receives torque in a case where the fixing members are fastened.

Moreover, since the height and shape of each ground portion 83 are changed depending on stress caused by the tightening torque for the fixing member, the mating between core 28 and horn plate 76 (module 12) can be further improved.

Even though three spoke core portions 37 formed of, for example, both left and right side spoke core portions 38 and one lower spoke core portion 39 are provided in the embodiment, the same effects can be obtained. In this case, each connecting portion 66 is formed so as to connect each side spoke core portion 38 to lower spoke core portions 39.

INDUSTRIAL APPLICABILITY

The present invention can be suitably used as a core of a steering wheel for a vehicle, such as an automobile.

REFERENCE SIGNS LIST

10 Steering wheel
12 Module
28 Core
35 Rim core portion
36 Boss core portion
37 Spoke core portion
66 Connecting portion
66a Upper end portion
66c Lower end portion
66d Constricted portion
66e Fixing portion
71 Expansion portion

What is claimed is:

1. A core of a steering wheel that is cast using a mold, the core comprising:
    a boss core portion at which a gate of the mold is set and which is connected to a shaft for steering;
    a rim core portion that is positioned around the boss core portion;
    upper and lower spoke core portions that connect the rim core portion at one end of the spoke core portions to the boss core portion at another end of the spoke core portions, respectively;
    a connecting portion that includes a fixing portion to which a module is fixed and connects the upper and lower spoke core portions positioned on upper and lower sides, respectively, in a steering reference state of the steering wheel;
    wherein the upper spoke core portion that is connected to an upper end portion of the connecting portion in the steering reference state has a width which increases downward in the steering reference state from the another end connected to the boss core portion toward the upper end portion of the connecting portion, and
    downward inclination of a lower edge of the upper spoke core portion that is connected to the upper end portion of the connecting portion in the steering reference state continues from the another end to the upper end portion of the connecting portion.

2. The core of a steering wheel according to claim 1, wherein the width of the upper spoke core portion at the upper end portion of the connecting portion is wider at a side of the another end than at a side of the one end.

3. The core of a steering wheel according to claim 1, wherein the connecting portion includes a constricted portion at a lower end portion thereof in the steering reference state.

* * * * *